US011223662B2

(12) United States Patent
Cho et al.

(10) Patent No.: US 11,223,662 B2
(45) Date of Patent: Jan. 11, 2022

(54) METHOD, SYSTEM, AND NON-TRANSITORY COMPUTER READABLE RECORD MEDIUM FOR ENHANCING VIDEO QUALITY OF VIDEO CALL

(71) Applicant: LINE CORPORATION, Tokyo (JP)

(72) Inventors: In Won Cho, Seongnam-si (KR);
Jungjun Park, Seongnam-si (KR);
Jongjin Cho, Seongnam-si (KR);
Dongwon Lee, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/802,708

(22) Filed: Feb. 27, 2020

(65) Prior Publication Data

US 2020/0220907 A1 Jul. 9, 2020

Related U.S. Application Data

(63) Continuation of application No. PCT/KR2017/009398, filed on Aug. 29, 2017.

(51) Int. Cl.
*H04N 19/00* (2014.01)
*H04N 21/00* (2011.01)
(Continued)

(52) U.S. Cl.
CPC .......... *H04L 65/403* (2013.01); *G06F 3/0482* (2013.01); *H04L 12/1827* (2013.01);
(Continued)

(58) Field of Classification Search
CPC .. H04N 7/14; H04N 19/30; H04N 21/234327; H04N 21/4788; H04N 21/41407; H04N 21/234345; H04N 21/4223; H04L 12/1827; H04L 65/1083; H04L 65/403; H04L 65/607; H04L 65/80; H04L 65/602; H04L 47/38; G06F 3/0482
See application file for complete search history.

(56) References Cited

U.S. PATENT DOCUMENTS

2008/0068446 A1\* 3/2008 Barkley ................. H04N 7/152
348/14.07
2014/0022329 A1 1/2014 Kim et al.
(Continued)

FOREIGN PATENT DOCUMENTS

CN 102348116 A 2/2012
CN 104412593 A 3/2015
(Continued)

OTHER PUBLICATIONS

Communication dated Feb. 1, 2021 by the State Intellectual Property Office of P.R. China in Chinese Application No. 201780094023.5.
(Continued)

*Primary Examiner* — Zhihan Zhou
(74) *Attorney, Agent, or Firm* — Sughrue Mion, PLLC

(57) ABSTRACT

Provided are a method, a system, and a non-transitory computer readable record medium for enhancing a video quality of a video call. A video call method may enhance and thereby forward a picture quality of a main object or a main portion in a video and thereby enhance a picture quality of experience of a recipient of a video call.

16 Claims, 9 Drawing Sheets

(51) Int. Cl.
*H04L 29/06* (2006.01)
*G06F 3/0482* (2013.01)
*H04L 12/18* (2006.01)
*H04L 12/811* (2013.01)
*H04N 21/2343* (2011.01)
*H04N 19/30* (2014.01)

(52) U.S. Cl.
CPC ............ *H04L 47/38* (2013.01); *H04L 65/607* (2013.01); *H04L 65/80* (2013.01); *H04N 19/30* (2014.11); *H04N 21/234327* (2013.01); *H04N 21/234345* (2013.01)

(56) References Cited

U.S. PATENT DOCUMENTS

| | | | | |
|---|---|---|---|---|
| 2014/0211842 A1* | 7/2014 | Zhao | ............... | H04N 19/12 375/240.02 |
| 2014/0355671 A1* | 12/2014 | Peng | ............... | H04N 19/124 375/240.03 |
| 2015/0334411 A1* | 11/2015 | Yamamoto | ......... | H04N 19/119 375/240.16 |
| 2017/0105034 A1* | 4/2017 | Fujimori | ............ | H04N 21/2187 |

FOREIGN PATENT DOCUMENTS

| | | |
|---|---|---|
| CN | 105379268 A | 3/2016 |
| CN | 105744271 A | 7/2016 |
| CN | 106162190 A | 11/2016 |
| JP | 2016-9925 A | 1/2016 |
| KR | 10-2009-0033964 A | 4/2009 |
| KR | 10-2009-0040533 A | 4/2009 |
| KR | 10-2009-0125556 A | 12/2009 |
| KR | 10-2014-0011264 A | 1/2014 |
| KR | 10-2014-0140916 A | 12/2014 |
| KR | 10-2017-0029723 A | 3/2017 |
| WO | 2014117049 A1 | 7/2014 |

OTHER PUBLICATIONS

International Search Report (PCT/ISA/210) dated May 24, 2018 issued by the International Searching Authority in International Application No. PCT/KR2017/009398.
Communication dated Jul. 20, 2021 issued by the Japanese Patent Office in Japanese Application No. 2020-511231.
Communication dated Nov. 2, 2021 by the China National Intellectual Property Administration in Chinese Application No. 201780094023.5.

* cited by examiner

METHOD, SYSTEM, AND NON-TRANSITORY COMPUTER READABLE RECORD MEDIUM FOR ENHANCING VIDEO QUALITY OF VIDEO CALL

CROSS-REFERENCE TO RELATED APPLICATION

This application is a continuation of International Application No. PCT/KR2017/009398 filed on Aug. 29, 2017, the disclosure of which is incorporated herein by reference in its entirety.

BACKGROUND

1. Field

Apparatuses and methods consistent with example embodiments relate to enhancing a video quality of a video call, and more particularly, to a video call method that may enhance a picture quality of a main portion of a video and forward the video having the enhanced picture quality, a computer apparatus for performing the video call method, and a non-transitory computer-readable record medium for implementing the video call method in a computer.

2. Description of Related Art

A video call refers to technologies for reception and transmission of audio-video signals by users at different locations, for communication between people in real time. A videophone or mobile phone with a video display, capable of simultaneous video and audio communication between people in real time, may be used to make a video call or video conference. Existing video call technologies may compress or encode an entire video based on a collective standard and may forward the compressed video. For example, a video call method in the related art uses a video codec and an audio codec that is determined based on an H.245 protocol-based negotiation between video call terminals.

However, the existing video call technologies compress a video based on a collective standard, for example, the video codec determined through the negotiation process in the above example, and forward the compressed video regardless of an importance of data, for example, a specific object or a specific portion, in the video. Therefore, in a low bandwidth, the entire quality of a video is degraded, which may lead to quality degradation of video data transmitted between video call participants.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a video call method that may enhance a picture quality of experience of a recipient of a video call by enhancing a picture quality of a main object or a main portion of a video and thereby forwarding the video, a computer apparatus for performing the video call method, and a non-transitory computer-readable record medium for implementing the video call method on a computer in conjunction with the computer.

According to an aspect of an example embodiment, there is provided a non-transitory computer-readable storage medium storing instructions that, when executed by a processor, cause the processor to perform a video call method including: generating a base layer having a first picture quality with respect to an entire portion of a captured image; generating an upper layer having a second picture quality higher than the first picture quality with respect to a partial portion of the captured image; encoding each of the base layer and the upper layer; and transmitting the encoded base layer, the encoded upper layer, and position information of the upper layer in the captured image to a counterpart terminal of a video call.

The counterpart of the video call may be configured to decode the base layer and the upper layer and reconstruct the captured image by merging the upper layer with the base layer based on the position information.

The video call method may further include assigning a first quality weight to pixels located in the partial portion of the captured image, and assigning a second quality weight different from the first quality weight to pixels in the captured image other than the partial portion.

The video call method may further include determining the second picture quality of the upper layer based on the first quality weight.

The video call method may further include: providing a user interface that allows a user to select an object in the captured image or to set a region in the captured image, wherein the partial portion of the captured image may include a portion corresponding to the object or the region.

The video call method may further include: identifying at least one of a terminal capability of the counterpart terminal of the video call and a state of a network between a terminal including the processor and the counterpart terminal; and determining at least one of a number of layers to be forwarded to the counterpart terminal and the second picture quality of the upper layer based on the at least one of the terminal capability of the counterpart terminal and the state of the network.

According to an aspect of an example embodiment, there is provided a non-transitory computer-readable storage medium storing instructions that, when executed by a processor, cause the processor to perform a video call method including: receiving data encoded for each of a base layer and an upper layer of a captured image and position information of the upper layer in the captured image; decoding the data into the base layer and the upper layer, the base layer having a first picture quality with regard to an entire portion of the captured image, and the upper layer having a second picture quality higher than the first picture quality with regard to a partial portion of the captured image; and reconstructing the captured image to have a higher picture quality than the first picture quality with respect to the partial portion of the captured image by merging the upper layer with the base layer based on the position information.

A transmission side of the video call may be configured to generate and encode each of the base layer and the upper layer, and transmit the encoded base layer, the encoded upper layer, and the position information of the upper layer to a receiving side of the video call including the processor.

The encoded data may include a first quality weight assigned to pixels located in the partial portion of the captured image, and a second quality weight assigned to pixels located in a remaining portion of the captured image other than the partial portion. The first quality weight may be different from the second quality weight.

According to an aspect of another example embodiment, there is provided a video call method including: generating a base layer having a first picture quality with respect to an entire portion of a captured image; generating an upper layer having a second picture quality higher than the first picture quality with respect to a partial portion of the captured image; encoding each of the base layer and the upper layer; and transmitting the encoded base layer, the encoded upper layer, and position information of the upper layer in the captured image to a counterpart terminal of a video call.

The counterpart terminal of the video call may be configured to decode the base layer and the upper layer and reconstruct the captured by merging the upper layer with the base layer based on the position information.

The video call method may further include: assigning a first quality weight to pixels located in the partial portion of the captured image, and assigning a second quality weight different from the first quality weight to pixels in a remaining portion of the captured image other than the partial portion.

The video call method may further include determining the second picture quality of the upper layer based on the first quality weight.

The video call method may further include: providing a user interface that allows a user to select an object in the captured image or to set a region in the captured image, wherein the partial portion of the captured image may include a portion corresponding to the object or the region.

The video call method may further include: identifying at least one of a terminal capability of the counterpart terminal of the video call and a state of a network between a terminal including the processor and the counterpart terminal; and determining at least one of a number of layers to be forwarded to the counterpart terminal and the second picture quality of the upper layer based on the at least one of the terminal capability of the counterpart terminal and the state of the network.

According to an aspect of an example embodiment, there is provided an electronic device for preforming a video call, the electronic device including: a processor; and a memory that, when executed by the processor, causes the processor to perform: capturing an image of a user; recognizing a target object from the image; generating a base layer which includes an entire portion of the image and to which a first quality weight is assigned; generating an upper layer which includes a partial portion of the image including the target object, and to which a second quality weight is assigned; generating position information that indicates a position of the upper layer in the image; and transmitting the base layer, the upper layer, and the position information to a counterpart electronic device to enable the counter electronic device to reconstruct the image based on the base layer, the upper layer, and the position information.

The second quality weight may represent a higher picture quality than the first quality weight.

The position information may indicate coordinates of pixels in the image at which the base layer is positioned.

BRIEF DESCRIPTION OF THE FIGURES

The above and/or other aspects will be more apparent by describing certain example embodiments, with reference to the accompanying drawings, in which.

DETAILED DESCRIPTION

Figure 1:
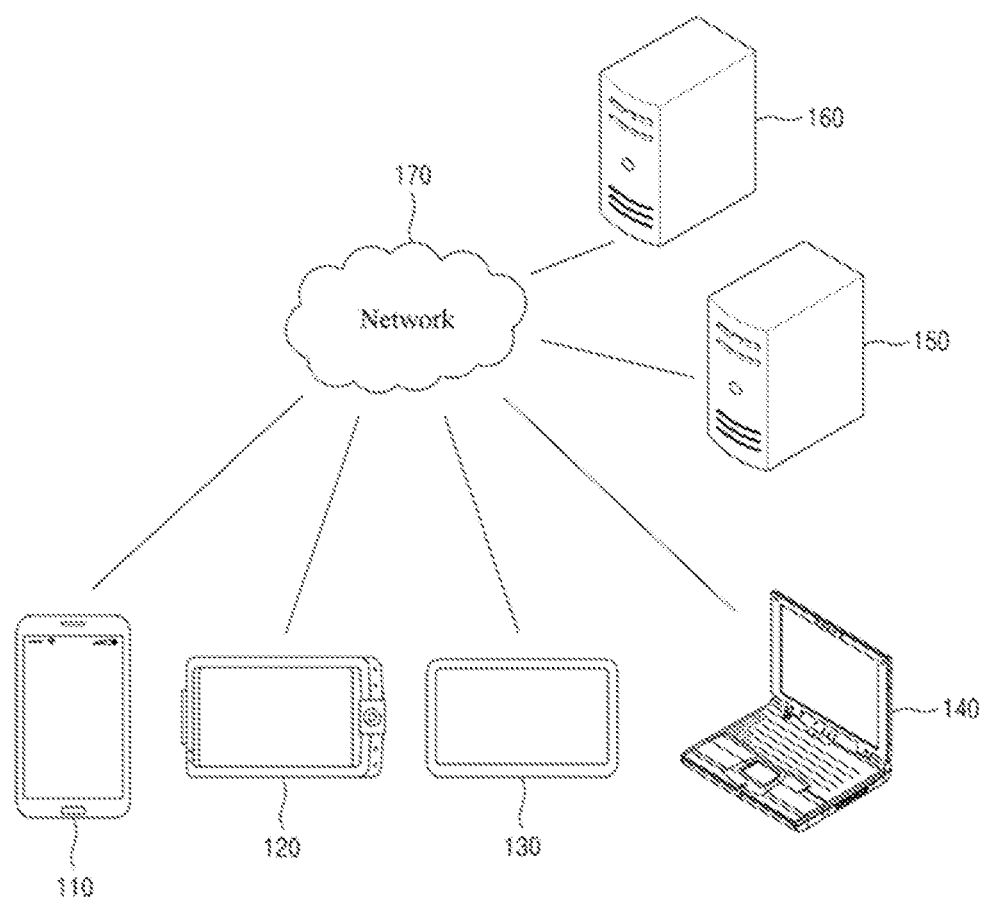
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A video call method according to example embodiments may be performed through a computer apparatus such as an electronic device, which is described below. Here, a computer program according to an example embodiment may be installed and executed on the computer apparatus and the computer apparatus may perform the video call method under control of the executed computer program. The aforementioned computer program may be stored in a non-transitory computer-readable record medium to implement the video call method on a computer in conjunction with the computer apparatus. For example, the electronic device may enhance a picture quality of a main object or a main portion in a video and may forward the video to a counterpart of the video call under control of an application for the video call installed on the electronic device. A single electronic device that performs the video call may be a transmitting side that transmits the video and at the same time, may be a receiving side (a counterpart side of the video call) that receives the video from the counterpart. Herein, for clarity, description is made by distinguishing a transmitting side that transmits a video for a single scene in a video and a receiving side that receives the video for the corresponding scene in terms of a single scene in the video.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the first client device 210A, the first client device 210A used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), Internet, and the like. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, and the like through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide a service (e.g., an information providing service, a messaging service, a mail service, a content transmission service, etc., in addition to a service for a video call according to the example embodiment) intended by an application through the application as a computer program installed and executed on the plurality of electronic devices 110, 120, 130, and 140, as the first service. As another example, the server 160 may provide the plurality of electronic devices 110, 120, 130, and 140 with a service that distributes a file for installing and executing the application, as the second service.

Figure 2:
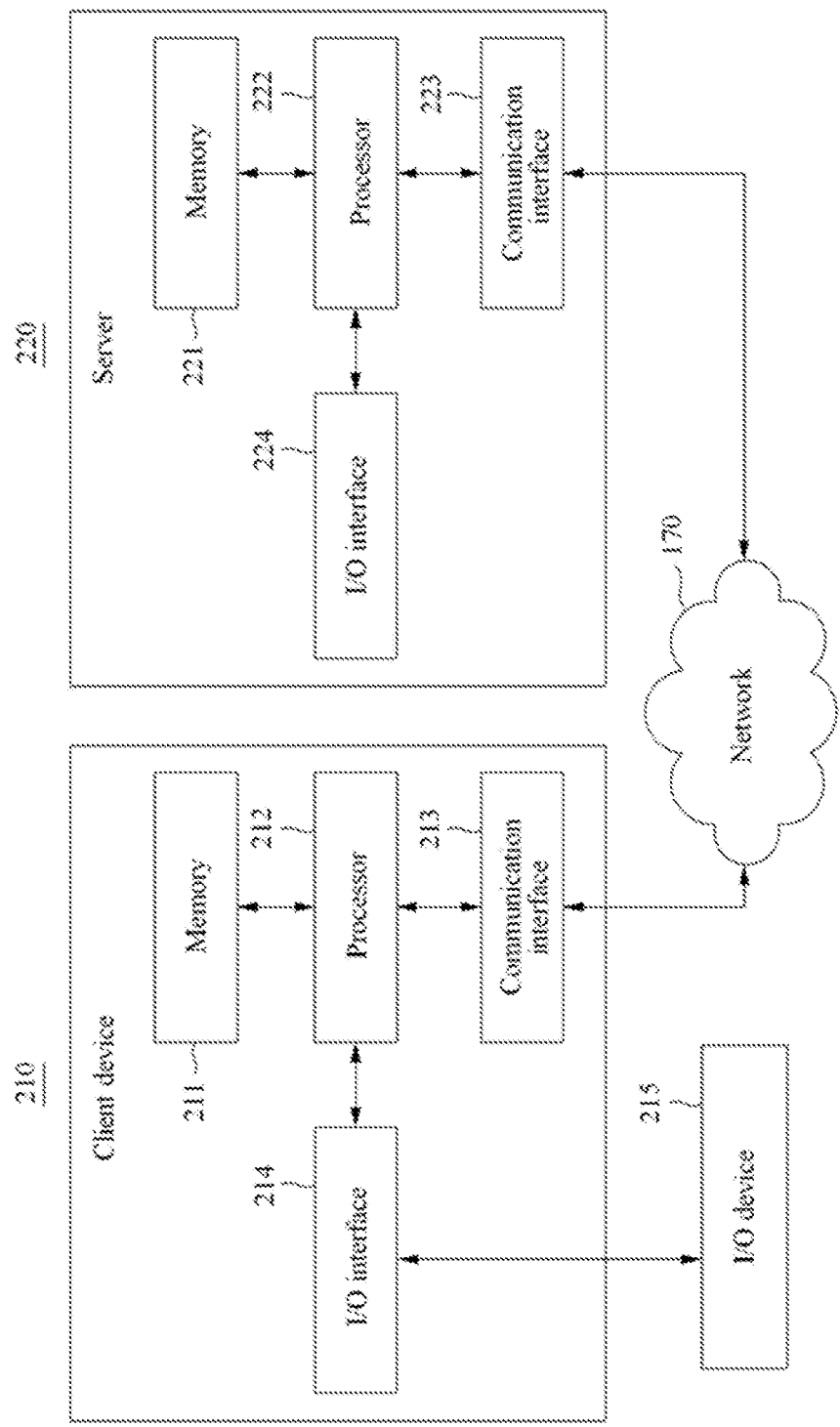
FIG. 2 is a diagram illustrating an example of an electronic device and a server according to at least one example embodiment.

FIG. 2 is a block diagram illustrating an example of a client device 210 and a server 220 according to example embodiments. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, etc., as a non-transitory computer-readable record medium. The permanent mass storage device, such as ROM and disk drive, may be included in the client device 210 or the server 220 as a permanent storage device separate from the memory 211, 221. Also, an OS or at least one program code (e.g., a code for a browser installed and executed on the client device 210 or an application installed and executed on the client device 210) may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 220, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device (e.g., the electronic device 120), or another server (e.g., the server 160), and/or between the server 220 and another client device (e.g., the electronic device 120) or server (e.g., the server 160). For example, the processor 212 of the client device 210 may transfer a request created based on a program code stored in the storage device such as the memory 211, to the server 220 over the network 170 under control of the communication interface 213. The client device 210 may receive a control signal, an instruction, content, a file, etc., provided under control of the processor 222 of the server 220 through the communication interface 213 of the client device 210, from the communication interface 223 of the server 220. For example, a control signal, an instruction, content, a file, etc., of the server 220 received through the communication interface 213 may be transferred to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, etc., and an output device may include a device, such as a display, a speaker, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 221, content or a service screen configured based on data provided from the server 220 or the electronic device 120 may be displayed on the display through the I/O interface 214.

According to other example embodiments, the client device 210 and the server 220 may include a smaller or greater number of components than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
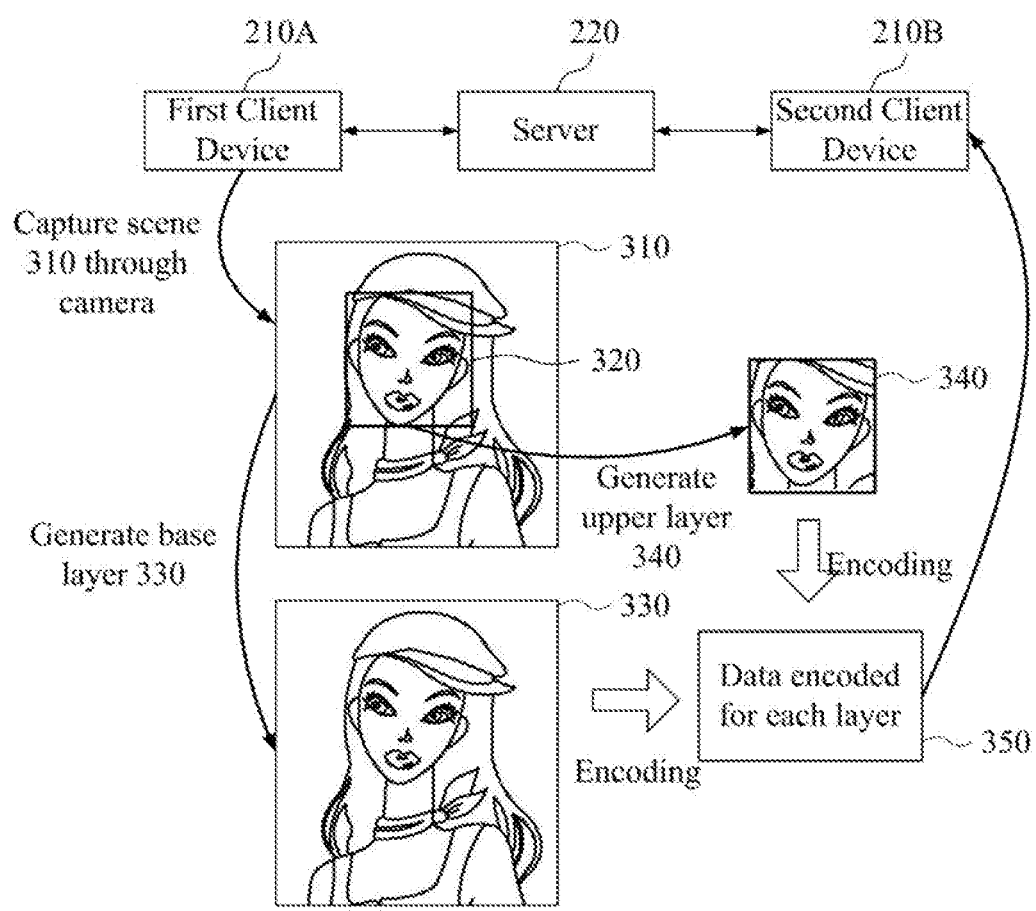
FIG. 3 illustrates an example of enhancing a picture quality of a main portion in a scene and forwarding the scene during a video call according to at least one example embodiment.

FIG. 3 illustrates an example of enhancing a picture quality of a main portion in a scene and forwarding the scene during a video call according to at least one example embodiment. FIG. 3 illustrates an example in which a video call is ongoing between a first client device 210A and a second client device 210B through the server 220. The server 220 forwards a packet transmitted from the first client device 210A to the second client device 210B and forwards a packet transmitted from the second client device 210B to the first client device 210A by routing packets for the video call.

Depending on example embodiments, the server 220 may establish an initial session for the video call between the first client device 210A and the second client device 210B. In this case, a packet may be transmitted through peer-to-peer (P2P) communication between the first client device 210A and the second client device 210B. For example, the first client device 210A may select an account (or a telephone number) of a user of the second client device 210B on a messenger application and may request the server 220 for a video call with the selected account. In response thereto, the server 220 may establish a session for the video call between an account (or a telephone number) of a user of the first client device 210A and the account (or the telephone number) of the user of the second client device 210B, and the first client device 210A and the second client device 210B may exchange packets through the session established for the video call.

The first client device 210A may capture a scene 310 through a camera for the video call. For example, the scene 310 may be a single frame captured through the camera of the first client device 210A. Here, the first client device 210A may identify a main portion 320 from the scene 310. In the first client device 210A, the main portion 320 may be set to a face region, and the first client device 210A may perform an object recognition on the captured scene 310 to identify the face region from the captured scene 310. A method of setting and identifying the main portion 320 from the scene 310 is further described below.

The first client device 210A may generate a base layer 330 having a basic picture quality (e.g., a first image resolution) with respect to the entire scene 310, and may separately generate an upper layer 340 having a higher picture quality (e.g., a second image resolution higher than the first image resolution) than the basic picture quality with respect to the identified main portion 320. The picture quality of the base layer 330 may be lower than or equal to an original picture quality of the captured scene 310, and the picture quality of the upper layer 340 may be greater than the picture quality of the base layer 330 and the original picture quality of the captured scene 310. In generating the upper layer 340, the first client device 210A may extract the main portion 320 from the captured scene 310 and may use only the extracted main portion 320. Here, the first client device 210A may encode each of the generated layers, for example, the base layer 330 and the upper layer 340. The upper layer 340 may be encoded by referring to encoding of the base layer 330. For example, the first client device 210A may encode the base layer 330 having the basic picture quality and may generate the upper layer 340 having a higher picture quality than the basic picture quality by referring to encoding of the base layer 330. In this manner, data 350 encoded for each layer may be generated. For example, if layer 1 is encoded as the base layer 330 and layer 2 is encoded as a first upper layer, the layer 2 may be encoded by referring to encoding of the layer 1. Meanwhile, if layer 3 is encoded as an upper layer (e.g., a layer having a higher picture quality than that of the layer 2) than the layer 2, the layer 3 may be encoded by referring to encoding of the layer 1 and/or the layer 2.

The data 350 encoded for each layer may be transmitted to the second client device 210B (e.g., a receiving side or a counterpart of the video call) through the server 220. Here, position information (e.g., pixel coordinates) of the upper layer 340 in the scene 310 may be generated by the first client device 210A and may be forwarded to the second client device 210B with the data 350 encoded for each layer. The position information of the upper layer 340 may be transmitted in a packet separate from the data 350, or may be included in the data 350. The data 350 may also include a time stamp that is associated with each layer to indicate the time at which a base image (e.g., the captured scene 310) for generating each layer is obtained, so that the receiving side of the video call is capable to recognize a pair of a base layer and an upper layer (e.g., the base layer 330 and the upper layer 340) which correspond to each other.

Figure 4:
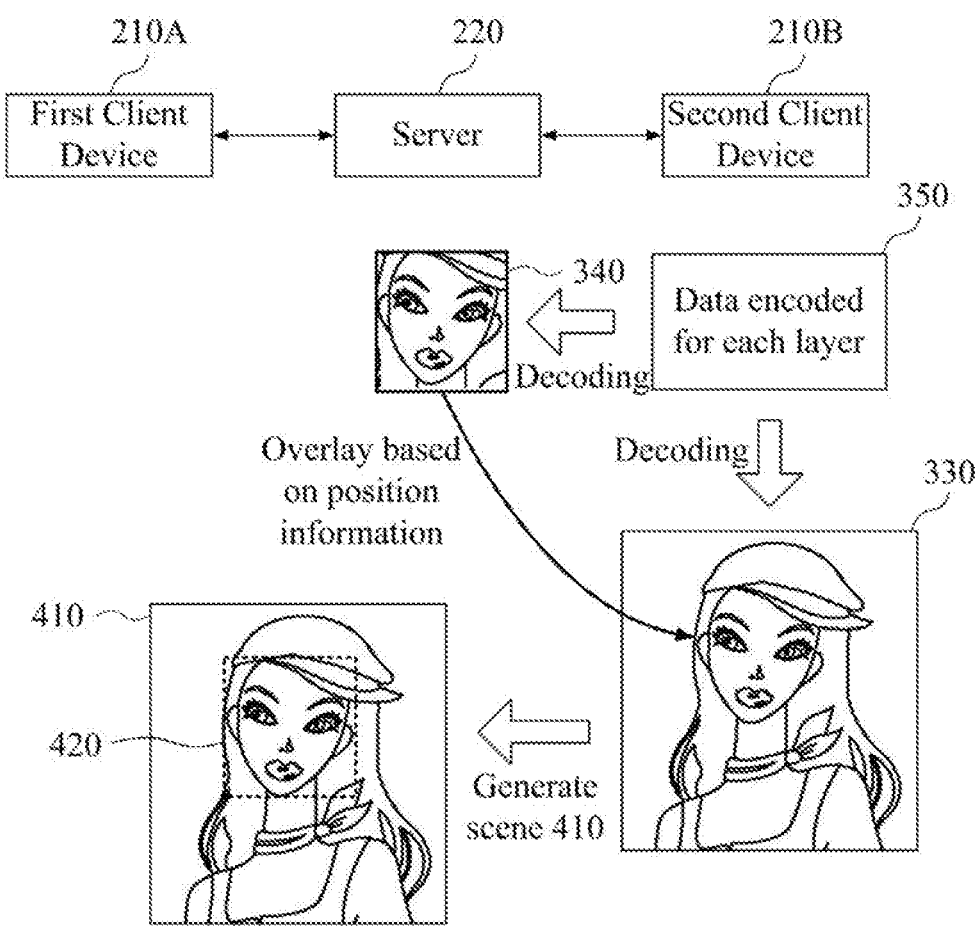
FIG. 4 illustrates an example of merging and displaying forwarded layers according to at least one example embodiment.

FIG. 4 illustrates an example of merging and displaying forwarded layers according to an example embodiment. FIG. 4 illustrates an example in which, in response to receiving the data 350 encoded for each layer and the position information of the upper layer 340 in the scene 310 of FIG. 3, the second client device 210B decodes the data 350 encoded for each layer and acquires the base layer 330 having the basic picture quality and the upper layer 340 having the higher picture quality than the basic picture quality. Here, the second client device 210B may decode the base layer 330 and then may decode the upper layer 340 by referring to decoding of the base layer 330.

Here, the second client device 210B may merge the upper layer 340 with the base layer 330 based on the received position information and may generate a scene 410 through the base layer 330 merged with the upper layer 340. For example, the second client device 210B may merge the base layer 330 and the upper layer 340 by synthesizing the upper layer 340 with the base layer 330 based on the time stamps, and laying the upper layer 340 over the base layer 330 at a position corresponding to the position information. As described above, since the upper layer 340 has a higher picture quality than the basic picture quality of the base layer 330, the second client device 210B acquires the scene 410 with the enhanced quality with respect to the main portion 320 of the initial scene 310. For example, a picture quality (a first picture quality) of an inner region of a box 420 indicated with dotted lines is higher than a picture quality (a second picture quality) of an external region of the box 420.

If the first client device 210A is to provide the first picture quality with respect to the entire initial scene 310, a required bandwidth or bitrate increases and network traffic increases accordingly. On the contrary, the example embodiments provide the first picture quality with respect to the main portion 420 and provide the second picture quality with respect to a remaining portion. Therefore, it is possible to decrease the required bandwidth or bitrate and, at the same time, to enhance a picture quality of experience of the user.

Although an example of setting and identifying a single main portion 320 is described with reference to FIGS. 3 and 4, two or more main portions may be set and identified. Upper layers generated for the respective two or more main portions may have the same quality or may have a different quality. Also, at least one of a plurality of upper layers may be set to have a lower quality than the basic picture quality.

Figure 5:
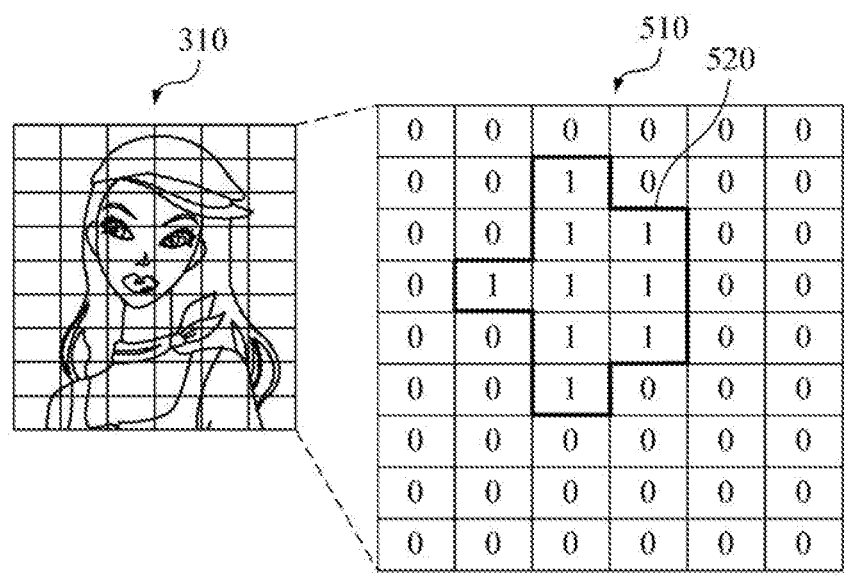
FIG. 5 illustrates an example of metadata for identifying a main portion according to at least one example embodiment.

FIG. 5 illustrates an example of metadata for identifying a main portion according to at least one example embodiment. FIG. 5 illustrates an example in which the scene 310 is segmented into regions through a block matrix with a size of 6×9. According to an increase in the size (n×m) of the block matrix that covers the scene 310, a number of blocks included in the block matrix may increase and the scene 310 with the same size may be further segmented in detail. Therefore, as the size of the block matrix increases, further segmented regions of the scene 310 may be identified. Basically, the block matrix may have the size of n×m. Here, each of n and m denotes a natural number of 2 or more. Maximally, regions of the scene 310 may be classified based on pixels of the scene 310. For example, if a resolution for videotaping of the camera is 1980×1080, the regions of the scene 310 may be classified based on a pixel unit through a block matrix with a size of 1980×1080.

Here, a value representing a quality weight may be set to each of the blocks included in the block matrix. The block matrix in which the quality weight is set to each of the blocks may be provided as metadata. FIG. 5 illustrates an example in which a quality weight '0' or '1' is set to each of the blocks included in the block matrix provided as metadata 510. Here, a region to which the quality weight '0' is set may denote a region for the basic picture quality and a region to which the quality weight '1' is set may denote a region for a higher picture quality than the basic picture quality. For example, referring to FIG. 5, a region surrounded by a bold solid line 520 may refer to the region to which the quality weight '1' is set and may be identified as a main portion. The first client device 210A may generate an upper layer with respect to the identified main portion (e.g., the region surrounded by the bold solid line 520).

Figure 6:
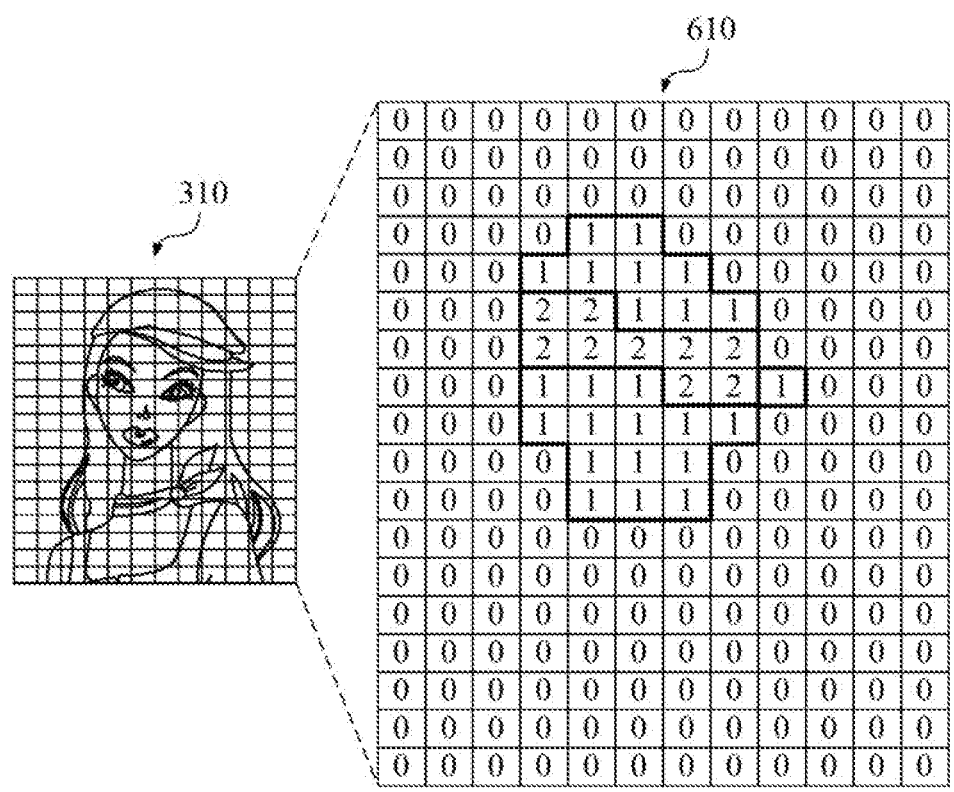
FIG. 6 illustrates another example of metadata for identifying a main portion according to at least one example embodiment.

FIG. 6 illustrates another example of metadata for identifying a main portion according to at least one example embodiment. FIG. 6 illustrates an example of metadata 610 corresponding to a block matrix in which a quality weight '2' is set to each of blocks including an eye, a quality weight '1' is set to each of blocks including a face excluding the eye, and a quality weight '0' for a basic picture quality is set to a remaining region.

In this case, the first client device 210A may identify a main portion corresponding to the quality weight '2' and three main portions corresponding to the quality weight '1'. Here, an upper layer may be generated for each of the identified main portions. That is, the first client device 210A may generate a total of five layers, for example, a single upper layer (hereinafter, layer 3) having a picture quality corresponding to the quality weight '2', three upper layers (hereinafter, layer 2) having a picture quality corresponding to the quality weight '1', and a single base layer (hereinafter, layer 1) corresponding to the entire scene 310, and may encode each of the layers.

In one example embodiment, the processor 212 of the first client device 210A may recognize, from the scene 310 including a facial image, a first plurality of pixels corresponding to the eyes, a second plurality of pixels corresponding to the face other than the eyes, and a third plurality pixels corresponding to the remaining pixels other than the first plurality of pixels and the second plurality of pixels. The processor 212 may assign different weights to the first plurality pixels, the second plurality of pixels, and the third plurality of pixels. For example, the processor 212 may assign weights 2, 1, and 0 to the first plurality pixels, the second plurality of pixels, and the third plurality of pixels, respectively, as shown in the table immediately below. The processor 212 may generate different layers according to the different weights. The processor 212 may generate metadata including the weights and the corresponding pixel positions (e.g., coordinate values of pixels corresponding to the weights), and may transmit the metadata to the second client device 210B so that the second client device 210B may decode image data received from the first client device 210A based on the metadata.

| Recognized objects from captured image | Weight | Layer |
| --- | --- | --- |
| Eyes | 2 | Layer 3 |
| Face other than eyes | 1 | Layer 2 |
| Other than face | 0 | Layer 1 |

Depending on example embodiments, three layers 2 may be generated as a single layer 2. For example, if a region (e.g., an eye region) corresponding to the quality weight '2' is a portion of a region (e.g., a facial region) corresponding to the quality weight '1', the region corresponding to the quality weight '1' and the region corresponding to the quality weight '2' may be identified as a single main portion.

In the example embodiment, since the layer 3 is merged to be overlaid on the layer 2, the facial region may not be divided into three layers 2. For this case, there is a need to set all of the quality weight '1' and the quality weight '2' to the blocks to which the quality weight '2' is set. That is, in the case of identifying the region corresponding to the quality weight '1', the first client device 210A may generate a single layer 2 with respect to the entire facial region by identifying the blocks to which all of the quality weight '1' and the quality weight '2' are set.

Here, a picture quality of a layer being generated may be set to increase according to an increase in a value of the quality weight. That is, a layer corresponding to the quality weight '1' may be generated to have a higher picture quality than that of a layer corresponding to the quality weight '0'. Likewise, a layer corresponding to the quality weight '2' may be generated to have a higher picture quality than that of the layer corresponding to the quality weight '1'. As described above, the first client device 210A may determine the picture quality of the upper layer based on the value of the quality weight.

Main portions of the scene 310 may be set based on a condition that is preset to an application installed on the first client device 210A. For example, a facial portion or an appearance portion of a person may be preset by considering the video call. Alternatively, a region of a specific object that combines with a video may be preset as a main portion in response to a selection from a user on a sticker, an image object, and the like provided from a service side of the video call to apply various effects to the video.

Further, artificial intelligence (AI) technology may be used to dynamically set various portions as main portions depending on circumstances. For example, in addition to portions (e.g., the aforementioned facial portion or appearance portion of the person) generally recognized and preset as main portions, AI may dynamically set, as a main portion, a portion including another portion (e.g., an eye, lips, an arm, etc.) of a specific object or a body that appears in the video. As another example, the AI may dynamically set, as the main portion, a portion that includes a specific object (e.g., the aforementioned sticker, image object, etc., provided from the service side of the video call) that combines with the video.

As described above, the main portion may be set using a region of an object in a video captured by a camera, such as the appearance of the person or a portion of the body of the person, or a specific object, and may be set using a region of a sticker or another image object provided to apply various effects to the captured video.

As another example, an application may provide a function that enables a user (e.g., the user of the first client device 210A) of the video call to directly select a specific object in the scene 310 or to set a region in the scene 310. Here, if the user selects the specific object or sets a specific region using the function provided from the application, the first client device 210A may set a portion corresponding to the selected object or the set region as a main portion under control of the application.

For example, the application may provide a function that enables the user to draw a closed curve along an outline of a specific object (e.g., an eye of the person) in the scene 310 displayed on a screen of the first client device 210A, and may set a region identified with the closed curve as a main portion. The first client device 210A may set a main portion of the scene 310 that is transmitted to the second client device 210B. Also, the first client device 210A may select a portion from a scene that is captured by the second client device 210B and received from the second client device 210B, and may transmit a request for setting the selected portion as a main portion so that the first client device 210A receives a higher quality of the main portion of the scene from the second client device 210B.

As another example, the application may provide a function that displays a figure in a preset shape (e.g., a rectangular or circular shape) on the screen of the first client device 210A and enables the user to adjust a size and/or a position of the displayed figure. Here, the application may set a region identified by the figure of which the size or the position is adjusted as a main portion. Also, the application may identify a specific object again on the region identified by the figure and may set a region of the identified specific object as the main portion.

As another example, the application may provide a function of automatically recognizing an object in the scene 310 associated with a position (e.g., a position (or a region) recognized on a touchscreen in response to a control of the user, such as a position(s) touched by the user in a touchscreen environment) selected by the user and setting a region of the recognized object as a main portion. Here, the application may further include a function of receiving a verification from the user regarding whether the recognized object is an object desired by the user.

Here, the first client device 210A may set the main portion by setting a quality weight of a block corresponding to the automatically set main portion or the main portion set by the user to be '1' or '2'. In this case, in the case of encoding the scene 310, the first client device 210A may identify the main portion through blocks to which the quality weight is set and may generate an upper layer.

Also, a number of layers and/or picture quality of the upper layer may be determined based on a terminal capability of a counterpart of the video call and/or network traffic.

Figure 7:
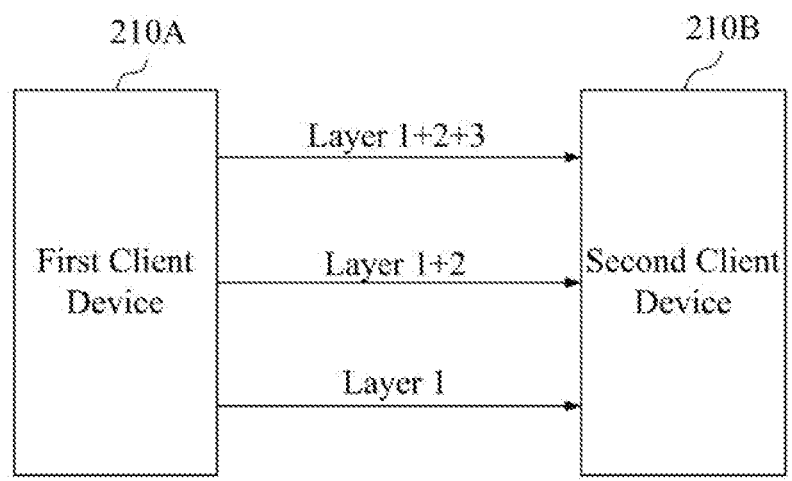
FIG. 7 illustrates an example of forwarding data encoded for each layer according to at least one example embodiment.

FIG. 7 illustrates an example of forwarding data encoded for each layer according to at least one example embodiment. For example, in terms of forwarding the scene 310, the first client device 210A that is a transmitting side of the video call may acquire and manage information about a terminal capability of the second client device 210B that is a counterpart of the video call and/or network state (e.g., network traffic). Information about the terminal capability of the second client device 210B may be acquired from the second client device 210B, and the network state may be acquired through the server 220. In FIG. 7, the server 220 is omitted. As described above, the server 220 may directly route packets transmitted and received between the first client device 210A and the second client device 210B for the video call. Depending on example embodiments, packets may be transmitted and received through P2P communication between the first client device 210A and the second client device 210B. Here, the first client device 210A may determine a picture quality of an upper layer or a number of layers with respect to the scene 310 based on the terminal capability of the second client device 210B and/or the network state. The state of the network may be determined based on a timestamp or a bit error rate of data received by the first client device 210A, or the second client device 210B. In another example embodiment, the second client device 210B may determine the network state based on the timestamp or the bit error rate, determine a quality of image data to be received from the first client device 210A based on the network state, and transmit a request for the determined quality of image data to the first client device 210A.

In the case of considering only the terminal capability, the first client device 210A may generate only a base layer having a basic picture quality and may forward the base layer to the second client device 210B if a value determined based on the terminal capability of the second client device 210B is less than or equal to a first threshold. FIG. 7 illustrates an example in which the first client device 210A forwards layer 1 corresponding to the base layer to the second client device 210B. Here, the layer 1 may be encoded at the first client device 210A and forwarded. In the following, description related to an encoding process is omitted. As another example, if a value determined based on the terminal capability of the second client device 210B is greater than the first threshold and is less than or equal to a second threshold, the first client device 210A may generate the base layer and an upper layer having a quality weight '1' and may forward the base layer and the upper layer to the second client device 210B. FIG. 7 illustrates an example in which the first client device 210A forwards the layer 1 corresponding to the base layer and the layer 2 corresponding to the upper layer having the quality weight '1' to the second client device 210B. For example, as described above with FIG. 5, the first client device 210A may generate the upper layer (layer 2) having the picture quality corresponding to the quality weight '1' with respect to a main portion, such as a facial portion, and may forward the generated upper layer and base layer to the second client device 210B. As another example, if the terminal capability of the second client device 210B is greater than the second threshold, the first client device 210A may generate each of the base layer, an upper layer having a quality weight '1', and an upper layer having a quality weight '2', and may forward the generated base layer and upper layers to the second client device 210B. FIG. 7 illustrates an example in which the first client device 210A forwards the layer 1 corresponding to the base layer, the layer 2 corresponding to the upper layer having the quality weight '1', and layer 3 corresponding to the upper layer having the quality weight '2'. For example, as described above with reference to FIG. 6, the first client device 210A may generate an upper layer (layer 3) having a picture quality corresponding to the quality weight '2' with respect to an eye portion, an upper layer (layer 3) having a picture quality corresponding to the quality weight '1' with respect to a facial portion, and may forward the generated layers 2 and 3 and the base layer to the second client device 210B.

Based on the network state, the number of layers to be forwarded to the second client device 210B or the picture quality may be determined based on a value determined based on the network state. Also, the number of layers forwarded to the second client device 210B or the picture quality may be determined based on a value of the terminal capability and a weighted sum of the network state and a threshold thereof.

Figure 8:
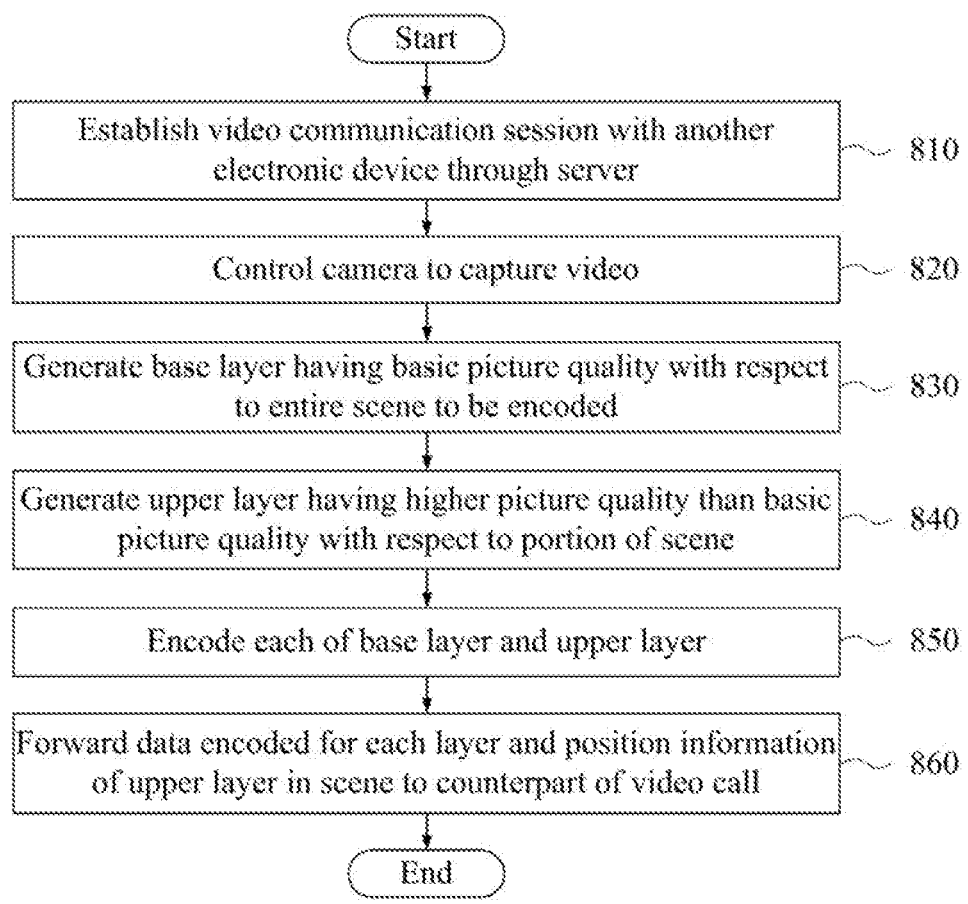
FIG. 8 is a flowchart illustrating an example of a video call method of an electronic device according to at least one example embodiment.

FIG. 8 is a flowchart illustrating an example of a video call method of an electronic device according to at least one example embodiment. The video call method according to example embodiments may be performed by a computer apparatus, for example, the first client device 210A. The first client device 210A may perform operations 810 to 860 included in the video call method of FIG. 8. For example, the processor 211 of the first client device 210A may be configured to execute a control instruction according to a code of at least one computer program (e.g., an application provided for the video call method) or a code of an OS included in the memory 211. Here, the processor 212 may control the first client device 210A to perform operations

810 to 860 of FIG. 8 in response to a control instruction provided from a code stored in the first client device 210A.

Referring to FIG. 8, in operation 810, the first client device 210A may establish a video call session with another electronic device through a server. Here, the server may correspond to the aforementioned server 220 and the other electronic device may correspond to the aforementioned second client device 210B. The server may directly route packets transmitted and received through the video call session between the first client device 210A and the other electronic device. Depending on example embodiments, the server may establish an initial session for P2P communication between the first client device 210A and the other electronic device such that the packets transmitted and received through the video call session may be directly forwarded through the P2P communication between the first client device 210A and the other electronic device.

In operation 820, the first client device 210A may control a camera to capture a video. For example, the first client device 210A may drive the camera to generate a screen for a video call and to forward the generated screen to the other electronic device with which the video call session is connected, and may capture the video input through the driven camera.

In operation 830, the first client device 210A may generate a base layer having a basic picture quality with respect to an entire scene to be encoded. For example, the first client device 210A may generate a base layer of a current scene to be encoded through an encoder provided from an application. Description related to the basic picture quality and the base layer is made above and further description is omitted.

In operation 840, the first client device 210A may generate an upper layer having a higher picture quality than the basic picture quality with respect to a portion of the scene. As described above, a portion of the scene for generating an upper layer refers to a main portion for enhancing a quality and may be identified based on metadata in which a quality weight is marked based on a pixel unit for the scene or a block unit that segments the scene. The picture quality of the upper layer may be determined based on a value of the quality weight. For example, the first client device 210A may receive the metadata in which the quality weight is marked based on the pixel unit or the block unit. Here, the first client device 210A may identify a region identified based on pixels marked with the same value of quality weights or a region identified through blocks marked with the same value of quality weights as the portion of the scene for the upper layer.

A plurality of different upper layers may be generated based on the set value of the quality weight and a picture quality of each of the upper layers may be basically set to be higher than the basic picture quality. Upper layers having a relatively higher picture quality may be generated according to an increase in the value of the quality weight. Depending on example embodiments, the quality weight on the base layer may be changed to degrade a picture quality of a specific region. For example, although the base layer having the quality weight of '0' is described as an example with reference to FIGS. 5 and 6, a base layer having a picture quality less than or equal to the basic picture quality in a region in which a quality weight '−1' is set may be generated by setting a quality weight of at least a portion of blocks of the base layer to '−1'. The region of the base layer of which the quality is to be relatively decreased may be set using a method identical or similar to a method of setting a main portion for the upper layer to enhance the quality. For example, in a video call, an appearance of the user may be set as a region having a basic picture quality, a facial portion of the user may be set as a main portion for generating an upper layer, and a background region around the appearance of the user may be set as a region for decreasing a picture quality.

Also, as described above, a portion of the scene may be selected or set by the user. For example, the first client device 210A may provide a function (e.g., a user interface) that enables the user to select an object in the scene or to set a region in the scene. In this case, the first client device 210A may identify a portion corresponding to the object selected through the function or the region set through the function as the portion of the scene for the upper layer.

Also, as described above, at least one of a number of layers to be forwarded to a counterpart and a picture quality of an upper layer may be determined based on a terminal capability of the counterpart and/or network state. For example, the first client device 210A may verify at least one of the terminal capability of the counterpart of the video call and the network state, and may determine at least one of a number of layers to be forwarded to the counterpart of the video call and the picture quality of the upper layer based on at least one of the verified terminal capability and network state. Here, information about the terminal capability may be received from another electronic device and the network state may be received from the server. A method of determining the number of layers and/or picture quality of the upper layer based on the terminal capability and/or network state is described above.

In operation 850, the first client device 210A may encode each of the base layer and the upper layer. Each of the base layer and the upper layer has a different picture quality. Therefore, one of various encoding methods used for a video call may be used without limiting to a specific method. Alternatively, different encoding methods may be used for each layer. That is, what is important lies in that the example embodiments may forward the upper layer having a higher picture quality than that of the base layer. Therefore, the encoding method is not limited to a specific method and technology related to encoding methods may be easily understood by those skilled in the art from the known arts.

In operation 860, the first client device 210A may forward data encoded for each layer and position information of the upper layer in the scene to the counterpart of the video call. The position information may be used to enhance a picture quality of experience with respect to the entire scene by enhancing an picture quality of a specific portion of the scene by merging the upper layer to be overlaid on the base layer. If necessary, information about a size of the upper layer may be further forwarded.

In this case, the counterpart of the video call that is the other electronic device may restore the base layer and the upper layer by decoding the data encoded for each layer, and may restore a scene having a higher picture quality than the basic picture quality with respect to the portion of the scene.

Figure 9:
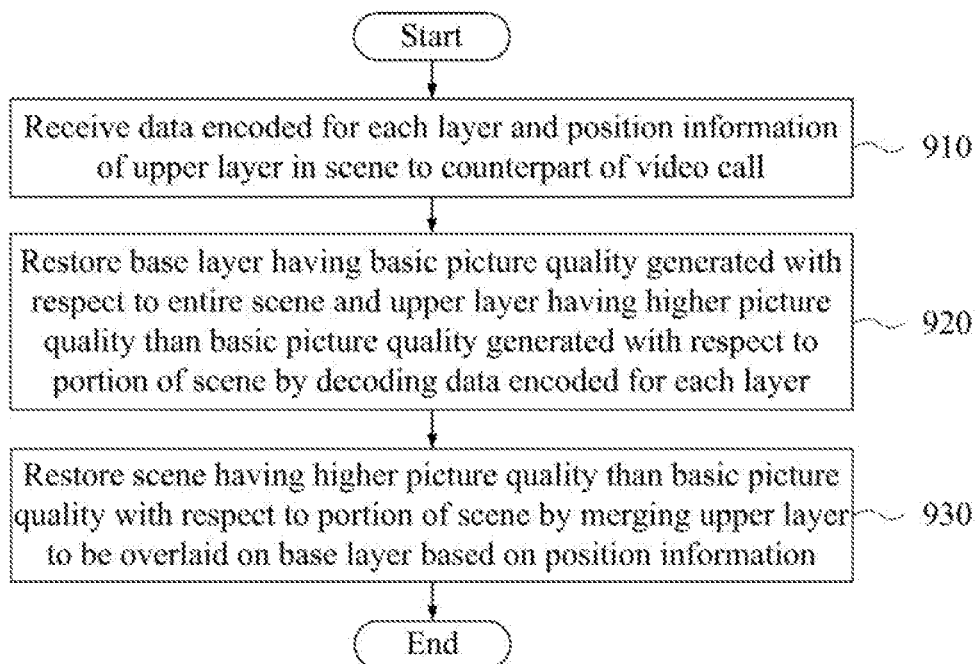
FIG. 9 is a flowchart illustrating an example of a video call method of an electronic device of a counterpart according to at least one example embodiment.

FIG. 9 is a flowchart illustrating an example of a video call method of an electronic device of a counterpart according to at least one example embodiment. The video call method according to example embodiments may be performed by a computer apparatus, such as the second client device 210B. As described above, the processor 222 of the second client device 210B may be configured to execute a control instruction according to a code of at least one computer program (e.g., an application provided for the video call method) or a code of an OS included in the memory 221 of the second client device 210B. Here, the processor 222 of the second client device 210B may control the second client device 210B to perform operations 910 to 930 of FIG. 9 in response to a control instruction provided from a code stored in the second client device 210B.

Referring to FIG. 9, in operation 910, the second client device 210B may receive data encoded for each layer with respect to a scene and position information of an upper layer in the scene. In the example embodiment of FIG. 9, it is assumed that the video call session through the server 220 is established between the first client device 210A and the second client device 210B, as described in operation 810 of FIG. 8, and data encoded for each layer with respect to the scene and position information of the upper layer in the scene is transmitted through the first client device 210A, as described in operation 860 of FIG. 8. Here, the second client device 210B may receive the data encoded for each layer and the position information of the upper layer in the scene.

In operation 920, the second client device 210B may restore a base layer having a basic picture quality generated with respect to the entire scene and the upper layer having a higher picture quality than the basic picture quality generated with respect to a portion of the scene by decoding the data encoded for each layer.

In operation 930, the second client device 210B may restore a scene having a higher picture quality than the basic picture quality with respect to a portion of the scene by merging the upper layer to be overlaid on the base layer based on the position information.

According to some example embodiments, it is possible to enhance a picture quality of experience of a recipient of a video call by enhancing a picture quality of a main object or a main portion of the video and thereby forwarding the video. Also, according to some example embodiments, it is possible to provide the same or a similar quality of experience by enhancing a picture quality of a main object or a main portion of a video and thereby forwarding the video, and to reduce a bitrate compared to a case of enhancing a picture quality of the entire video.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video call method comprising:
generating a base layer having a first picture quality with respect to an entire portion of a captured image;
identifying at least one of a terminal capability of a counterpart terminal of a video call and a state of a network between a terminal and the counterpart terminal;
determining at least one of a number of layers to be forwarded to the counterpart terminal and a second picture quality of an upper layer based on the at least one of the terminal capability of the counterpart terminal and the state of the network;
extracting a partial portion of the captured image, and generating the upper layer having the second picture quality that is higher than the first picture quality, based on the extracted partial portion of the captured image, and the determined at least one of the number of layers and the second picture quality;
encoding each of the base layer and the upper layer; and
transmitting, to the counterpart terminal of the video call, the encoded base layer, the encoded upper layer, and position information of the upper layer in the captured image that allows the counterpart terminal to lay the upper layer over the base layer.

2. The video call method of claim 1, wherein the counterpart terminal of the video call is configured to decode the base layer and the upper layer and reconstruct the captured by merging the upper layer with the base layer based on the position information.

3. The video call method of claim 1, further comprising:
assigning a first quality weight to pixels located in the partial portion of the captured image, and assigning a second quality weight that is different from the first quality weight to pixels in a remaining portion of the captured image other than the partial portion.

4. The video call method of claim 3, further comprising determining the second picture quality of the upper layer based on the first quality weight.

5. The video call method of claim 1, further comprising:
providing a user interface through which an object in the captured image is selectable or a region in the captured image is settable,
wherein the partial portion of the captured image comprises a portion corresponding to the object or the region.

6. A non-transitory computer-readable storage medium storing instructions that are executable by a processor to cause the processor to perform the video call method of claim 1.

7. The non-transitory computer-readable storage medium of claim 6, wherein the counterpart terminal of the video call is configured to decode the base layer and the upper layer, and reconstruct the captured image by merging the upper layer with the base layer based on the position information.

8. The non-transitory computer-readable storage medium of claim 6, wherein the video call method further comprises assigning a first quality weight to pixels located in the partial portion of the captured image, and assigning a second quality weight to pixels in the captured image other than the partial portion, the first quality weight being different from the second quality weight.

9. The non-transitory computer-readable storage medium of claim 8, wherein the video call method further comprises determining the second picture quality of the upper layer based on the first quality weight.

10. The non-transitory computer-readable storage medium of claim 6, wherein the video call method further comprises:
providing a user interface through which an object in the captured image is selectable or a region in the captured image is settable, and
wherein the partial portion of the captured image comprises a portion corresponding to the object or the region.

11. A non-transitory computer-readable storage medium storing instructions that are executable by a processor to cause the processor to perform a video call method comprising:
receiving data encoded for each of a base layer and an upper layer of a captured image and position information of the upper layer in the captured image;
decoding the data into the base layer and the upper layer, the base layer having a first picture quality with respect to an entire portion of the captured image, and the upper layer including a partial portion of the captured image and having a second picture quality that is higher than the first picture quality; and
reconstructing the captured image to have a picture quality that is higher than the first picture quality with respect to the partial portion of the captured image by laying the upper layer over the base layer based on the position information of the upper layer,
wherein the upper layer is generated by identifying at least one of a terminal capability of a counterpart terminal of a video call and a state of a network between a terminal and the counterpart terminal, determining at least one of a number of layers to be forwarded to the counterpart terminal and the second picture quality of the upper layer based on the at least one of the terminal capability of the counterpart terminal and the state of the network, and generating the upper layer based on the determined at least one of the number of layers and the second picture quality.

12. The non-transitory computer-readable storage medium of claim 11, wherein the terminal is a transmission side of the video call, and the counterpart terminal is the receiving side of the video call, and
wherein the transmission side of the video call is configured to generate and encode each of the base layer and the upper layer, and transmit the encoded base layer, the encoded upper layer, and the position information of the upper layer to the receiving side of the video call comprising the processor.

13. The non-transitory computer-readable storage medium of claim 11, wherein the encoded data comprises a first quality weight assigned to pixels located in the partial portion of the captured image, and a second quality weight assigned to pixels located in a remaining portion of the captured image other than the partial portion, and
wherein the first quality weight is different from the second quality weight.

14. An electronic device for preforming a video call, the electronic device comprising:
a memory storing instructions; and
a processor that is configured to execute the instructions stored in the memory to:
capture an image of a user;
recognize a target object from the image;
generate a base layer which comprises an entire portion of the image and to which a first quality weight is assigned;
identify at least one of a terminal capability of a counterpart electronic device of the video call and a state of a network between the electronic device and the counterpart electronic device;
determine at least one of a number of layers to be forwarded to the counterpart electronic device and a second quality weight of an upper layer based on the at least one of the terminal capability of the counterpart electronic device and the state of the network;
extract a partial portion of the image comprising the target object; and generate the upper layer based on the extracted partial portion of the image, by assigning the second quality weight to the upper layer, and based on the determined at least one of the number of layers and the second quality weight;
generate position information that indicates a position of the upper layer in the image; and
transmit the base layer, the upper layer, and the position information to the counterpart electronic device to enable the counterpart electronic device to reconstruct the image by laying the upper layer over the base layer based on the position information.

15. The electronic device of claim 14, wherein the first quality weight corresponds to a first picture quality and the second quality weight corresponds to a second picture quality that is higher than the first picture quality.

16. The electronic device of claim 14, wherein the position information indicates coordinates of pixels in the image at which the base layer is positioned.

* * * * *